March 19, 1957 J. H. PROWINSKY 2,785,807
STRAIGHT LINE LIFT TRUCK
Filed Feb. 3, 1953 8 Sheets-Sheet 1

INVENTOR
JOSEPH H. PROWINSKY
BY
ATTORNEYS

March 19, 1957 J. H. PROWINSKY 2,785,807
STRAIGHT LINE LIFT TRUCK
Filed Feb. 3, 1953 8 Sheets-Sheet 4

March 19, 1957    J. H. PROWINSKY    2,785,807
STRAIGHT LINE LIFT TRUCK

Filed Feb. 3, 1953    8 Sheets-Sheet 5

March 19, 1957  J. H. PROWINSKY  2,785,807
STRAIGHT LINE LIFT TRUCK
Filed Feb. 3, 1953  8 Sheets-Sheet 6

March 19, 1957  J. H. PROWINSKY  2,785,807
STRAIGHT LINE LIFT TRUCK
Filed Feb. 3, 1953  8 Sheets-Sheet 7

March 19, 1957  J. H. PROWINSKY  2,785,807
STRAIGHT LINE LIFT TRUCK
Filed Feb. 3, 1953  8 Sheets-Sheet 8
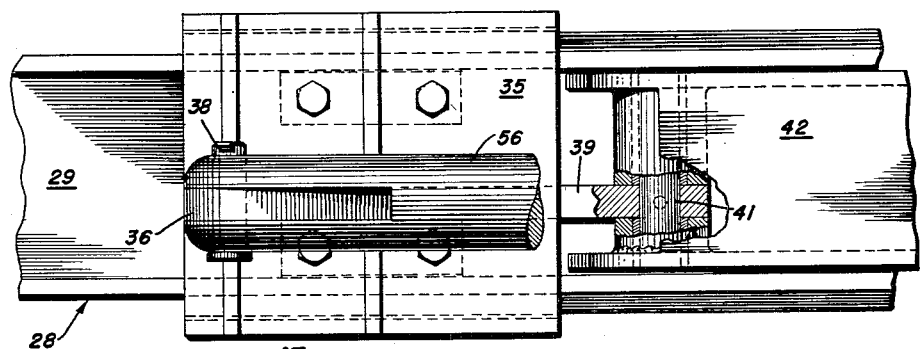
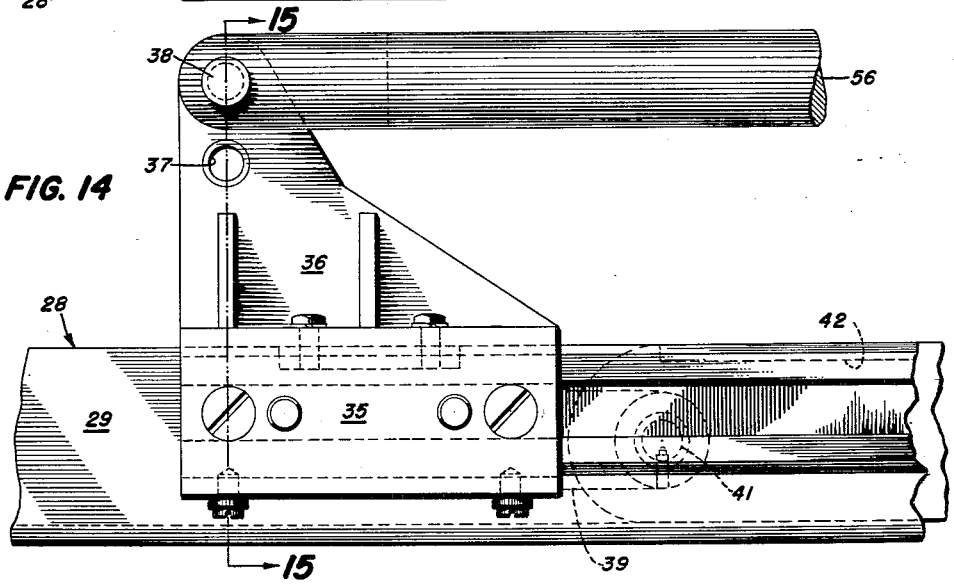
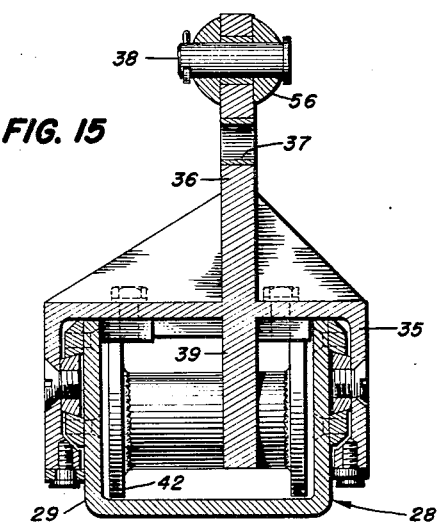

United States Patent Office 2,785,807
Patented Mar. 19, 1957

2,785,807

STRAIGHT LINE LIFT TRUCK

Joseph H. Prowinsky, Washington, D. C.

Application February 3, 1953, Serial No. 334,990

9 Claims. (Cl. 214—1)

(Granted under Title 35, U. S. Code (1952), sec. 266)

The invention described herein may be manufactured and used by or for the Government of the United States of America for governmental purposes without the payment of any royalties thereon or therefor.

This invention relates to a lifting mechanism and more particularly to a lift truck for raising objects in a substantially vertical line parallel with or to a predetermined angle of inclination with respect to the surface upon which the lift truck is supported.

It is the practice in loading the wing bomb racks of aircraft, particularly those which are launched from carriers, to place a bomb on a lift truck, positioning the truck adjacent a particular aircraft and then raising the bomb to the rack of the craft. Substantially, the same practice has been followed in loading the bomb bays of land-based aircraft.

The lifting mechanisms in prior use, when employed for lifting bombs to the bomb racks of various types of aircraft, have not been entirely satisfactory under all conditions of service. Heretofore, high lift trucks have employed a pivoted arm type of lifting structure thereby raising the load through an arcuate path. Such lifting structures have caused undesirable components of horizontal movement to be introduced during the lifting operation which, when coupled with the component of vertical movement, have made it difficult, if not impossible, to initially locate the lift truck in a proper position so that the bomb load carried thereon could be secured to a bomb rack within or beneath the wings of the aircraft, as the case may be, with safety to the operating personnel and adjacent equipment and with a minimum expenditure of time and labor. For example, in order to compensate for objectionable horizontal movement resulting when raising the bomb, it frequently has been found necessary to release the parking brakes of the truck and move it, with its load elevated, on the deck of an aircraft carrier the inclination of which is continuously changing due to roll and pitch. The elevated load on such lift trucks creates a high center of gravity causing the trucks to be difficult to maneuver and easily overturned due to the changing inclination of the deck thereby being a source of injury to operating personnel and damage to adjacent equipment.

A compact, simple, practical, vertical straight-line, push-up type of lifting structure has been long sought after, particularly for the purpose of raising bomb loads to the bomb racks of carrier borne as well as land-based aircraft. In loading operations of this type accomplished heretofore, a straight-line lift to even relatively low heights has been considered obtainable, from a practical aspect, only by the use of a lift of the pull-up type.

The pull-up type of lift employs either manual or electric hoist mechanisms and, in addition to the undesirable requirement of unreeling the cables from these hoists and in some instances threading the cable into the bomb rack to be loaded, the pull-up type requires the attachment of hoisting bands or slings in an estimated correct position on the bomb befoe lifting. Further, the removal of these bands or slings must be accomplished after the bomb has been finally attached to its racks. Loading with the pull-up type of hoist has involved the laborious and time consuming operations of not only experimenting as to the correct positioning of the slings on the bomb but also manual positioning and securing of the bomb within the bomb bay as well as the releasing of the lifting cables from the bomb in close and cramped quarters.

Although there have been numerous other lifting devices which employ structure which will produce vertical lifting none has been found to be entirely satisfactory for loading the bomb racks of carrier borne or land-based aircraft under varying operating conditions. One reason for the superior qualities of the present invention as applied to such lifting operations, resides in the novel combination of other features together with structure for producing a vertical lift, the complete combination being particularly adapted for cooperation with an auxiliary carriage or load carrying skid of specific design and construction but which forms no part of the present invention. Another reason that none of the devices of the prior art have been entirely satisfactory when employed in the loading of bombs into the bomb bays of carrier borne aircraft is because of the lack of some provision for longitudinal, lateral, and rotational adjustments of the load during any stage of the lifting operation.

The present invention contemplates the provision of a lift truck, which will approach the load from below, raise the load off an auxiliary carriage and then elevate the load vertically to a position within the bomb bay of an aircraft or adjacent a wing type bomb rack, as the case may be. By virtue of the straight line lifting motion of the truck it is possible to determine beforehand the proper position of the truck so that the bomb will be in alignment with the bomb rack throughout the entire lifting operation without maneuvering the truck. In addition, the truck is provided with a load supporting assembly which may be adjusted within a limited range to any desired position with respect to the bomb rack of the aircraft to be loaded. More specifically, the invention herein disclosed includes an adjustable load supporting assembly having structural features which permit the bomb load to be moved laterally and longitudinally relative to the bomb rack and the lift truck as well as to be rotated relative to horizontal and vertical axes, as will become more clearly apparent as the description proceeds.

Accordingly it is an object of this invention to provide a truck having a straight line lift motion.

It is a further object of this invention to provide a lift truck having a load supporting assembly which is adjustable to permit limited movement of a load to any desired direction relative to the truck.

An additional object resides in the provision of a lift truck having means for lifting a load vertically with the longitudinal axis of the load rigidly maintained throughout the lifting operation in a parallel relationship with the surface upon which the lift truck rests.

A further object of the present invention is the provision of a lift truck having means for lifting a load vertically to an elevated position in which the longitudinal axis of the load is inclined at a predetermined angle relative to the surface upon which the lift truck rests.

It is a still further object of this invention to provide a lift truck having frame and lifting members so constructed that the latter will nest within the frame when the lifting members are in a lowered position.

Yet another object is the provision of an easily maneuverable straight line lift truck.

A further object is the provision of a straight line lift truck having a Y-shaped chassis and a load supporting assembly which may be positioned within the open end of the chassis to receive a load from an auxiliary carriage.

Other objects and many of the attendant advantages of this invention will be readily appreciated as the same becomes better understood by reference to the following detailed description when considered in connection with the accompanying drawings wherein:

Fig. 13 is an enlarged detailed top plan view of the lower end of one of the linking members which is pivotally connected to a bracket slidably mounted on the truck frame;

Fig. 14 is an enlarged detailed vertical side elevational view of the structure disclosed in Fig. 13 and showing the bracket guide rails mounted on the truck frame; and Fig. 15 is a vertical sectional view taken along a line substantially corresponding to line 15—15 of Fig. 14 disclosing the manner in which the bracket is slidably mounted on the truck frame.

Figure 1:
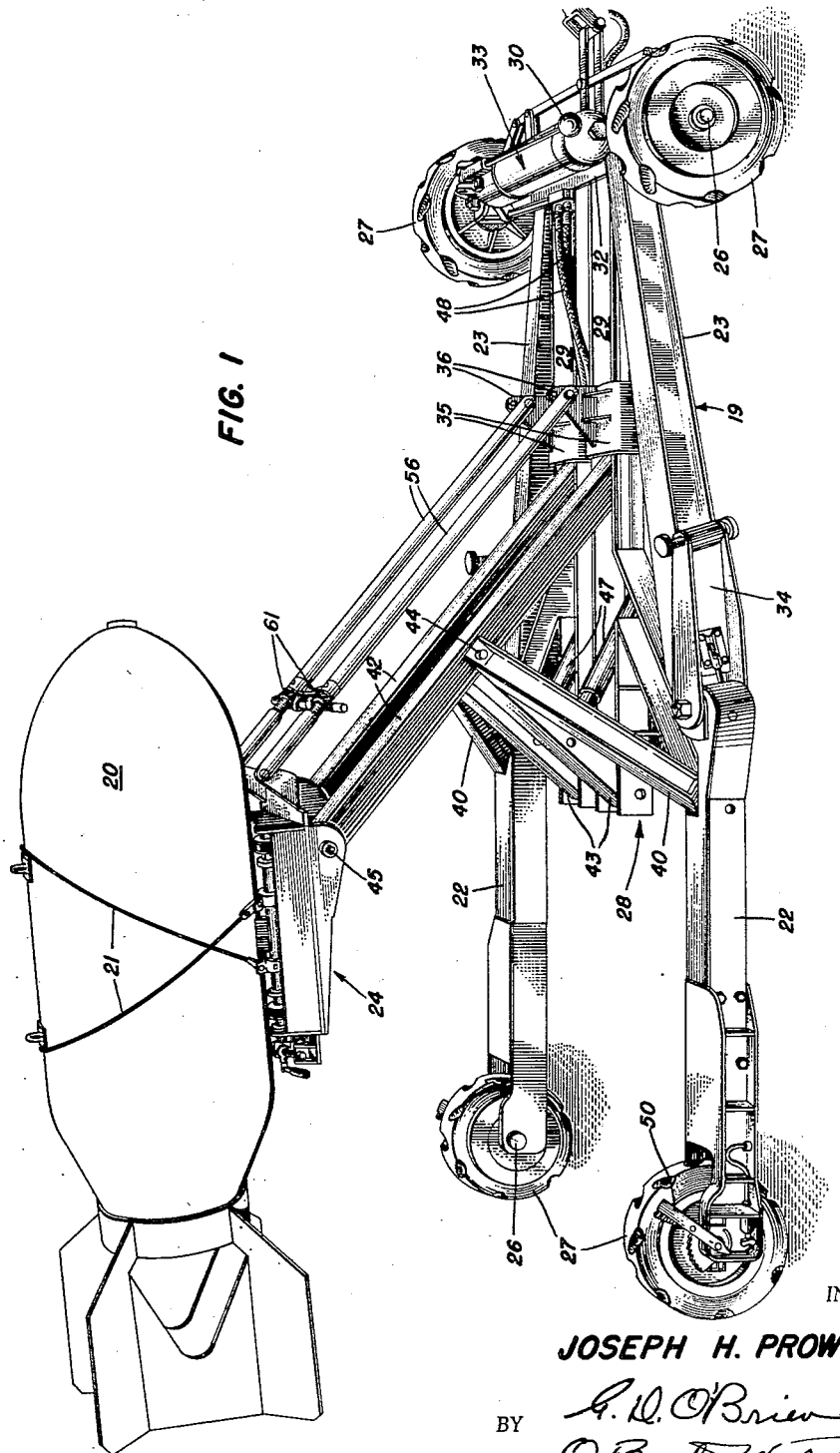
Fig. 1 is a perspective view of a straight line lift truck constructed in accordance with the present invention.
Figure 3:
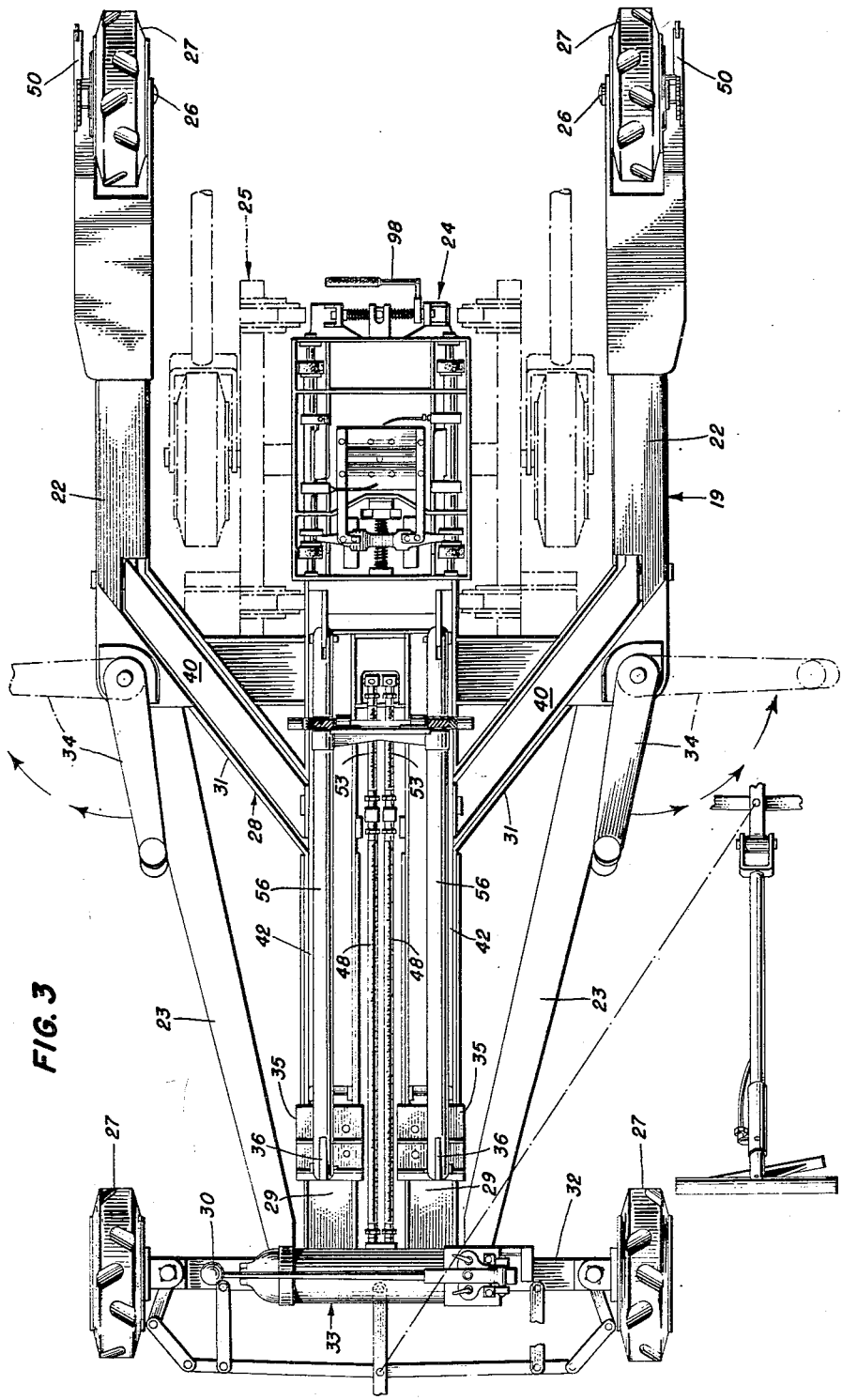
Fig. 3 is a top plan view of the lift truck disclosing the disposition of the after or rearward portion thereof with respect to the load supporting assembly and also showing in broken lines an auxiliary carriage, forming no part of the present invention, which may be employed in transferring an article to the lift truck.

Referring now to the drawings wherein like reference numerals designate like parts throughout the several views of the drawings and more particularly to Figs. 1 and 3, it will be observed that the numeral 19 generally designates the chassis of a straight line lift truck of the type contemplated by the present invention which is particularly well adapted for moving a load such as bomb 20 in a vertical path, the load being secured to the truck by cables 21. Chassis 19 is comprised of a pair of trailing members 22 which may be of box or channel construction.

By employing channel members in the chassis, provision is made for nesting various components of the lift structure when in the lowered position, as is best illustrated in Fig. 3. Stowage of equipment is important on shipboard and it is frequently a necessary requirement that equipment be compact in order to conserve space when not in use. The nesting feature is thus an attribute of the present invention that renders it particularly useful on board ships as well as in other places where space is limited and compactness of equipment is desired.

The chassis 19 is of generally Y-shaped configuration, reinforced by braces 23 for greater strength and stability. The Y-shaped configuration of the chassis 19 is advantageously employed so that the load may be delivered to a position above the load supporting assembly, generally designated by numeral 24, by an auxiliary carriage 25, shown in phantom in Fig. 3, when the load supporting structure is in its lowered position.

The braces 23 and trailing members 22 are provided with axles 26 and wheels 27 at the forward and rearward ends thereof, the right and left portions of the lift truck, as viewed in Fig. 1, being referred to throughout the specification as the forward and rearward portions, respectively. Forming a part of chassis 19 and at the forward portion thereof is mounted a substantially Y-shaped frame structure, generally indicated by the reference numeral 28, and which comprises a pair of parallel channel members 29 to which are rigidly secured the rearwardly and laterally extending channel spanning members 31 functioning to provide additional support for members 29. Spanning members 31 may be secured to the trailing members 22 in any manner found suitable for the purpose, such, for example, as by welding or the like.

The parallel channel members 29 and braces 23 extend forwardly and are secured to one another at their forward ends by transverse beam 32 which also rigidly connects braces 23 to one another. The transverse beam 32 carries a fluid storage tank and pump assembly, generally designated by numeral 33, which supplies hydraulic fluid under pressure to the lifting cylinders, to be described more fully hereinafter. In addition, chassis 19 is provided with a pair of laterally swingable outriggers 34 which may be utilized during the lifting operation for maximum support, if so desired.

Slidably mounted on the forward extension of the channel members 29 are inverted U-shaped brackets 35 having the depending legs thereof in embracing relation with the channel members 29 and slidably secured thereto in any convenient manner, such as by the dove-tail, keyed, track arrangement, as is best shown in Figs. 13, 14, and 15.

Projecting upwardly at right angles to the top surface of each bracket 35 and parallel with the direction of motion of the bracket, the flange 36 is provided having a pair of apertures or openings 37 and 38 therein for a purpose later to be described. A downwardly and rearwardly extending finger 39, Figs. 13, 14 and 15, projects from the undersurface of each bracket 35 and is pivotally connected, as shown at 41 in Figs. 13 and 14, at the rearwardly projecting portion thereof to one of the lift beams 42.

Figure 2:
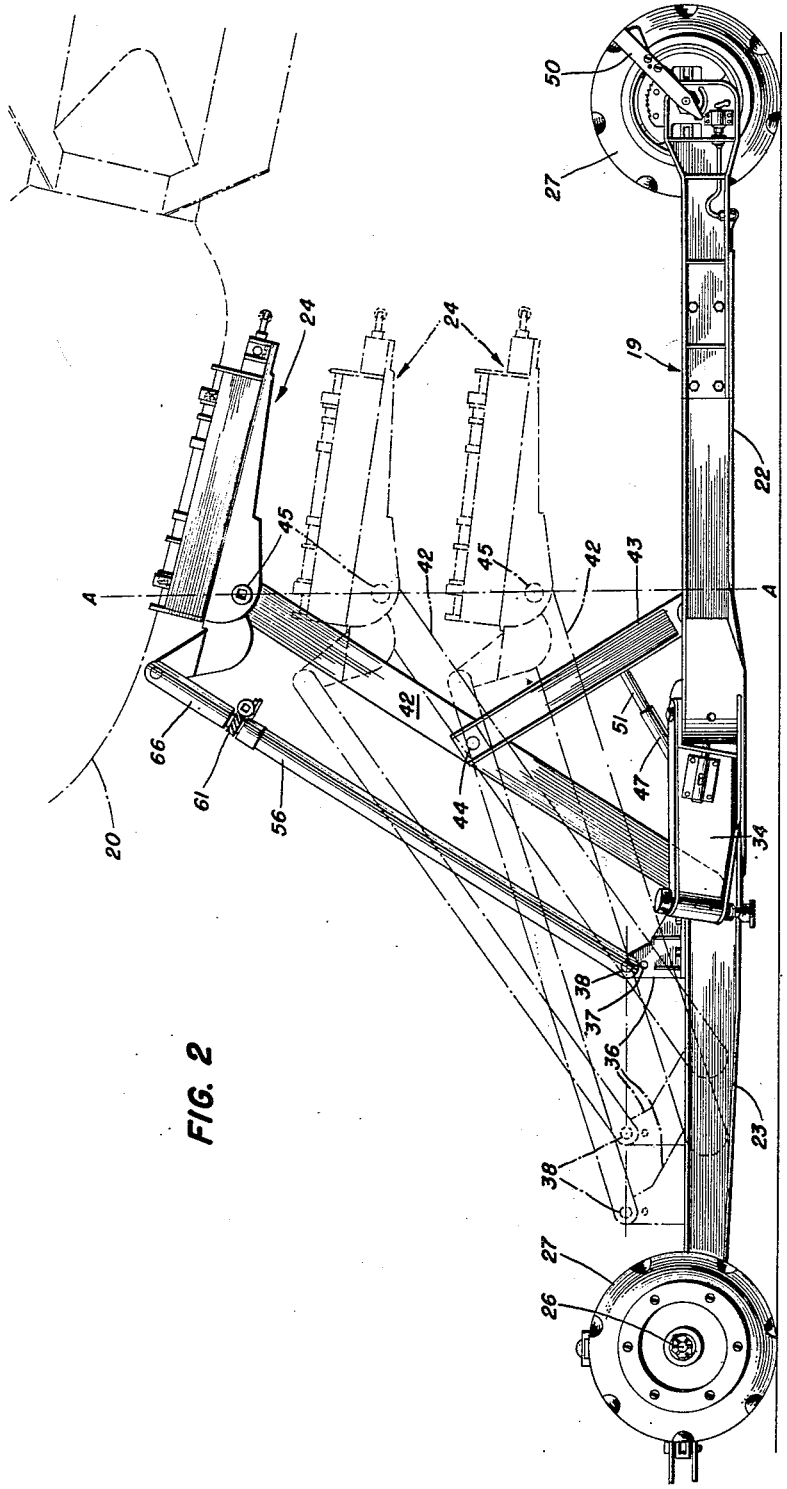
Fig. 2 is a side elevation view of the lift truck and disclosing in broken lines an article being lifted in a straight line motion to an elevated position at which the longitudinal axis of the article will have a predetermined angle of inclination relative to the lift truck supporting surface.
Figure 12:
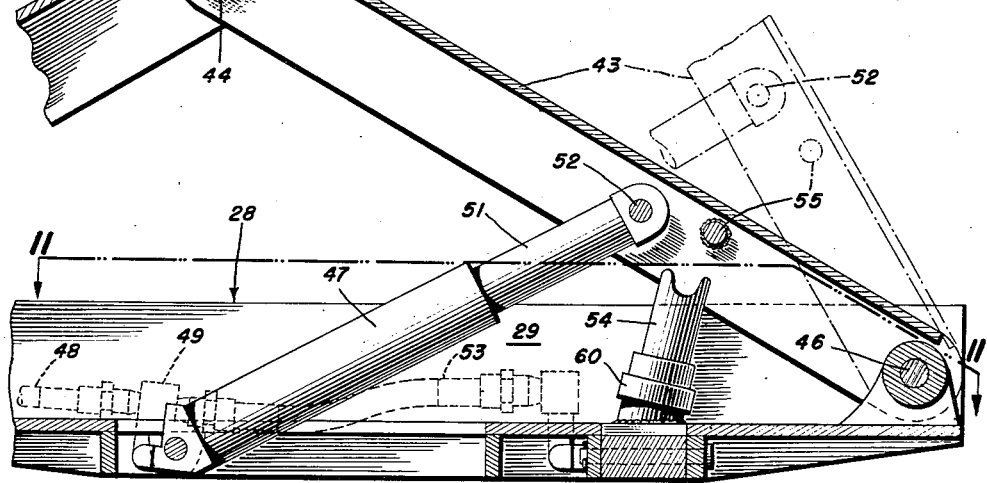
Fig. 12 is a side elevation view partly in vertical section as viewed from line 12—12 of Fig. 11, showing the hydraulically actuated pistons in operative connection with one of the members of the lift structure.

As is best viewed in Figs. 1, 2, and 12, each of the lift beams 42 is pivotally connected to a lift arm 43 at substantially the mid-point 44 between the ends of the lift beam. Each lift arm 43 is, in turn, pivotally connected adjacent the lower end thereof to its respective channel member 29 at a point rearwardly of the aforementioned pivotal connection between lift beam 42 and bracket 35.

It is important, as will be more readily appreciated as the description proceeds, that the lift arm pivotal connections, previously mentioned, are separated by a distance equal to the distance between pivotal connections 41 and 44 of the lift beam 42. At the upper end of the lift beam 42, as viewed in Figs. 1 and 2, is a pivotal connection including pin 45 which is spaced from the pivotal connection 44 by a distance equal to the distance between pivotal connections 44 and 46 of lift arm 43. The connection which includes pin 45 is more than a mere pivotal connection for the load supporting assembly 24 in that it also functions to impart transverse movement to the load supporting assembly, as will be described later.

Figure 11:
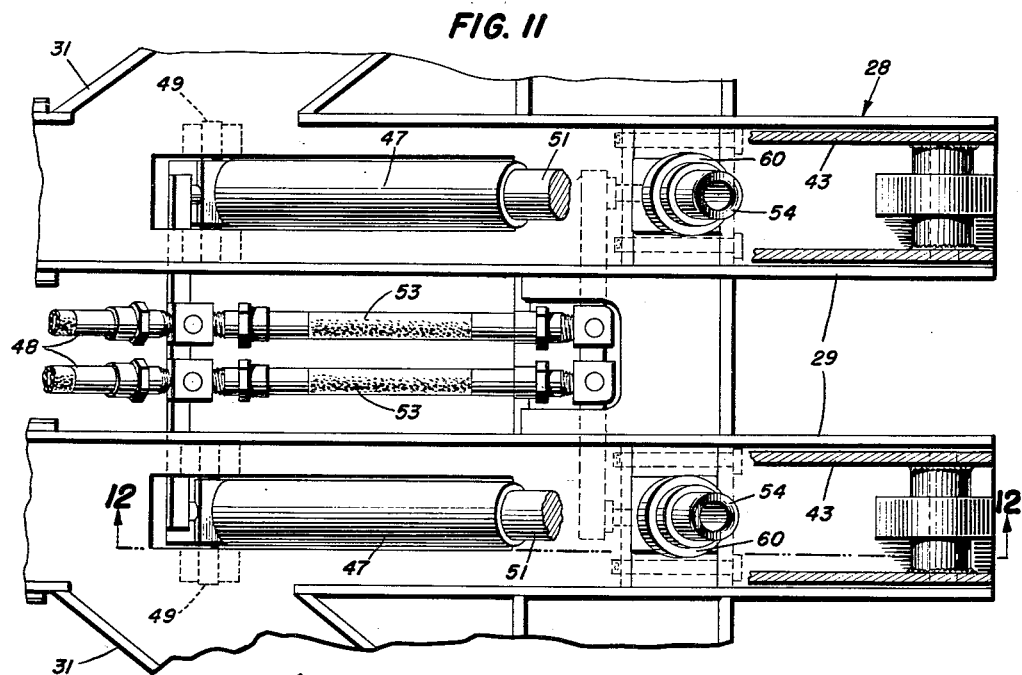
Fig. 11 is an enlarged top plan view taken along a line substantially corresponding to line 11—11 of Fig. 12, showing a portion of the frame of the lift truck with the linking members removed and disclosing hydraulically operated pistons for effecting movement of the lifting beam.

Referring particularly now to Figs. 1, 3, 11, and 12 it will be noted that hydraulic fluid contained within tank 33 is connected to a pair of hydraulic cylinders 47 by means of a pair of hydraulic hose lines 48 and conduits 49. Each of the hydraulic cylinders 47, Figs. 11 and 12, is pivotally connected to its respective channel member 29. Each hydraulic cylinder 47 is provided with a piston 51 pivotally connected at the outer end thereof to its respective lift arm 43, as indicated at 52, Fig. 12.

When the lifting structure is in the lowered or nested position lifting beams 42 and lifting arms 43 are parallel with one another and with the hydraulic cylinders 47 and pistons 51, thereby preventing initial movement of the lifting structure by the actuation of pistons 51 alone. Therefore, auxiliary hydraulic cylinders 60 respectively connected to conduits 49 by flexible conduits 53 are provided with and actuate pistons 54 which are bifurcated at the outer end thereof so as to cooperatively receive a lug 55 on each of the lifting arms 43 when the latter are in a lowered position. The auxiliary hydraulic cylinders 60 and associated pistons 54 function to slightly elevate the lifting arms 43 thereby eliminating the parallel relationship aforementioned and making it possible for the hydraulic cylinders 47 and pistons 51 associated therewith to elevate the lifting arms 43 and the lifting beams 42 to any desired height within the operational limits of the invention.

In a parallel lift operation the longitudinal axis of the load remains parallel, or substantially parallel, to a predetermined plane throughout the entire lift. For example, if it is known that the bomb racks of a carrier borne aircraft to be loaded are either parallel with, or at a particular inclination with respect to the deck of an aircraft carrier, a bomb may be elevated either parallel to the deck or to that particular inclination with respect to the deck, as the case may demand.

The structure of the invention which provides for a parallel lift operation is best viewed in Figs. 1 and 2. A pair of extensible linking members 56, to be more fully described hereinafter, are pivotally connected between the upstanding flanges 36 of the slidably mounted bracket 35 and the load supporting assembly 24 in such a manner that the linking members are parallel with the lift beams 42. As shown in Figs. 1 and 2, the parallel relationship between linking members 56 and lift beams 42 is effected by pivotally connecting the linking members 56 at the lower end thereof in the lower pivot aperture 37 in each flange 36. Such an arrangement, in effect, provides a parallelogram wherein the length of each linking member 56 is equal to the length of each lift beam 42, and the distance between the upper points of pivotal connection of each linking member 56 and each lift beam 42 is equal to and parallel with the distance between the points of lower pivotal connection between each linking member and each lift beam.

Should it be desired automatically to introduce an angle of maximum inclination of 10 degrees relative to the deck of an aircraft carrier, for example, the lower end of each linking member 56 is pivotally connected in the upper pivot aperture 38 of its respective flange 36. It will be apparent that additional pivot apertures may be provided in the flanges 36 for other predetermined angles of inclination.

It will thus be understood from the foregoing description that, by providing a number of pivot apertures in each of the flanges 36, the angle of inclination of the longitudinal axis of the load relative to a horizontal plane may be selectively established to correspond with the angle of inclination of the bomb racks of various types of aircraft. Each pivot aperture may be labeled in any satisfactory manner so as to indicate the type of aircraft for which it is designed to be used. As is best disclosed in Fig. 2, wherein the pivot connections at the lower ends of the linking members 56 include the upper pivot apertures 38, the load supporting assembly 24 will present the bomb to the rack at an angle of inclination of 10 degrees at maximum elevation relative to the plane of the deck.

It will be observed from an inspection of Fig. 2 that the load supporting assembly 24 will be tilted from a substantially horizontal position in the lowermost position thereof to a predetermined angle of inclination relative to the deck in the elevated position when the linking members 56 are connected to the flange 36 by utilizing the upper pivot apertures 38. This is a desirable feature of the present invention for the reason that it automatically enables the load supporting assembly to be substantially parallel at the time of load transfer from the skid to the lift truck. If it were not for this feature of the invention manual adjusting means would be required in order to provide the parallel relationship of the load supporting assembly which is necessary when the invention is used in conjunction with the skid 25. In addition, this feature permits firm engagement of the load supporting assembly with the bomb as the former lifts the bomb off a skid or the auxiliary carriage of the type designated at 25 in Fig. 3.

As afore-mentioned, the angle of inclination of the load may be determined for any particular aircraft with which the lift truck of the present invention is to be used. In addition, it might be varied over some limited range by adjustment of the length of the linking members 56 in order to compensate for any condition which may alter the predetermined angle of inclination of the particular type aircraft such, for example, as the load already within the aircraft.

Figure 9:
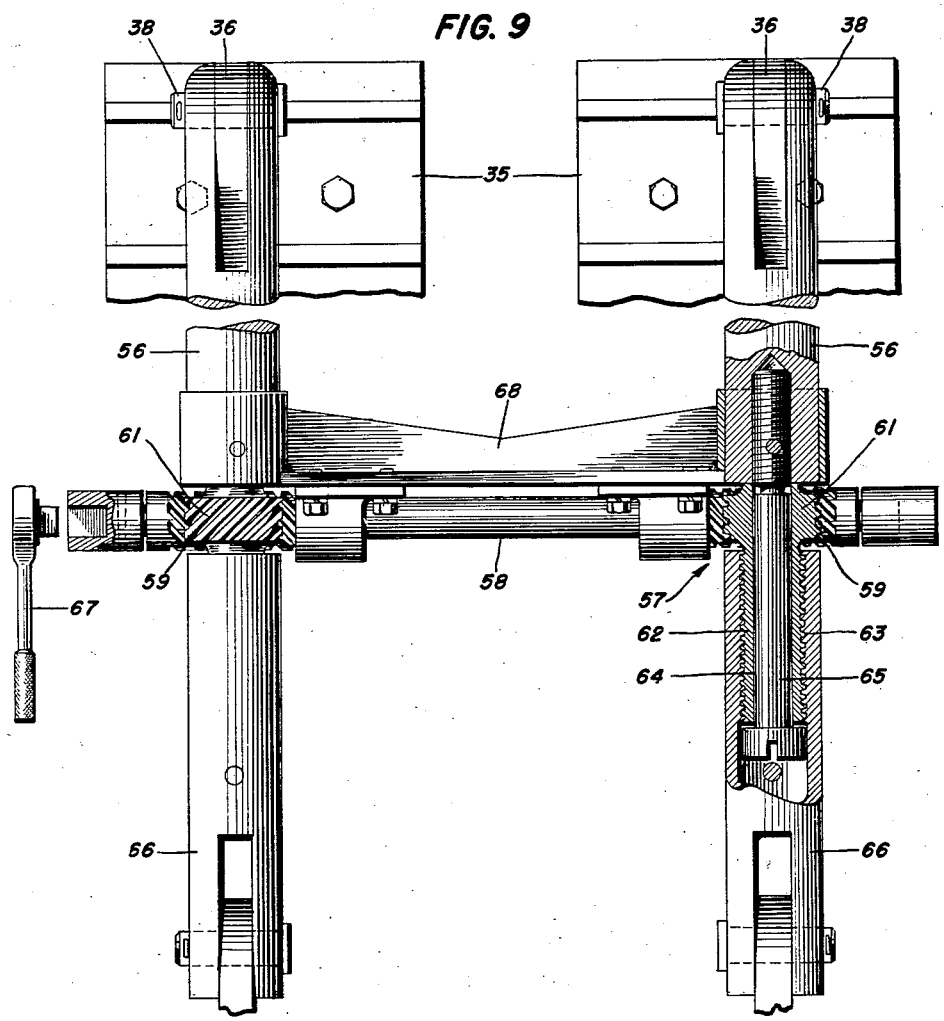
Fig. 9 is an enlarged top plan view partially in horizontal section disclosing means for adjusting the length of the lift truck linking members to vary the angle of tilt of the load supporting assembly about a horizontal axis and with respect to a horizontal plane in order to properly position an article supported thereon with respect to a load receiving means.
Figure 10:
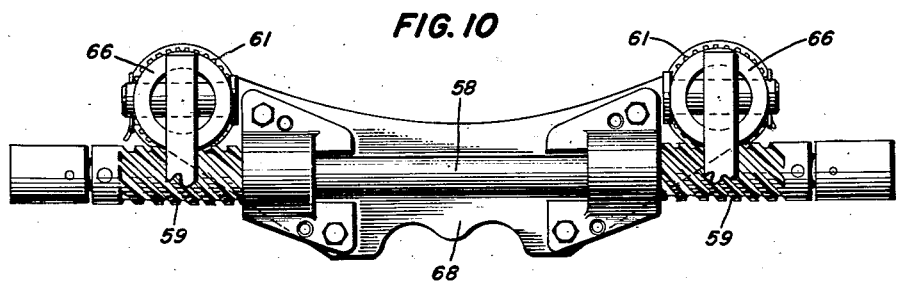
Fig. 10 is an end view of the linking members and the means for adjusting the length thereof.

Reference is now made to Figs. 9 and 10 wherein the means for extending the linking members 56 and effecting such an adjustment is best illustrated. As shown in Fig. 9, the adjusting means, generally indicated by numeral 57, includes a rotatably supported drive rod 58 having spaced worm drives 59 formed thereon. Each of the worm drives 59 meshes with and drives a mating worm wheel 61 which is provided on the upper side thereof with an extending, externally threaded shank portion 62. The shank portion 62 threadably engages internal threads 63 in rods 66. Each worm wheel 61 and the portion 62 thereof is provided with a longitudinal bore 64 through which a stud 65 extends and is threaded into and secured within the upper end of a linking member 56. Any suitable means may be provided for rotating rod 58, as a ratchet handle 67, for example. In addition, any mounting bracket which is found suitable for the purpose may be provided to rotatably mount rod 58 upon linking members 56 and at the correct position so that the worm drives 59 mesh with the driven worm wheels 61. One such mounting bracket which has been found satisfactory is indicated in Figs. 9 and 10 by the numeral 68.

It will be apparent from an inspection of Fig. 2 that the combination of structural features employed in the present invention will produce a substantially vertical lift along line A—A. More specifically, it will be observed that a pair of upper and lower isosceles triangles having a common side are defined for each side of the lift structure thereby assuring a vertical lift along line A—A. The upper isosceles triangle of each side is defined by lift arm 43, the upper half of lift beam 42 and line A—A. The lower isosceles triangle of each side of the lift structure is provided by lift arm 43, the lower half of lift beam 42, and the portion of the channel member therebetween.

Although it is contemplated that the lift truck will be initially positioned so that the bomb will be in alignment with the bomb rack of the aircraft, it will be appreciated that some inaccuracy of positioning of the lift truck is possible. Adjusting means therefore have been provided for shifting the load laterally, longitudinally, and rotationally about a vertical axis. These adjustments are in addition to the adjustment of the linking members 56, previously described with reference to Figs. 9 and 10, which serves to rotate the load supporting assembly 24 and its load about a horizontal axis which may be considered as the pivotal connection 45. The adjustment means for shifting the load laterally, longitudinally, and rotationally about a vertical axis are best disclosed in Figs. 4 through 8 and will now be described in that order.

Figure 6:
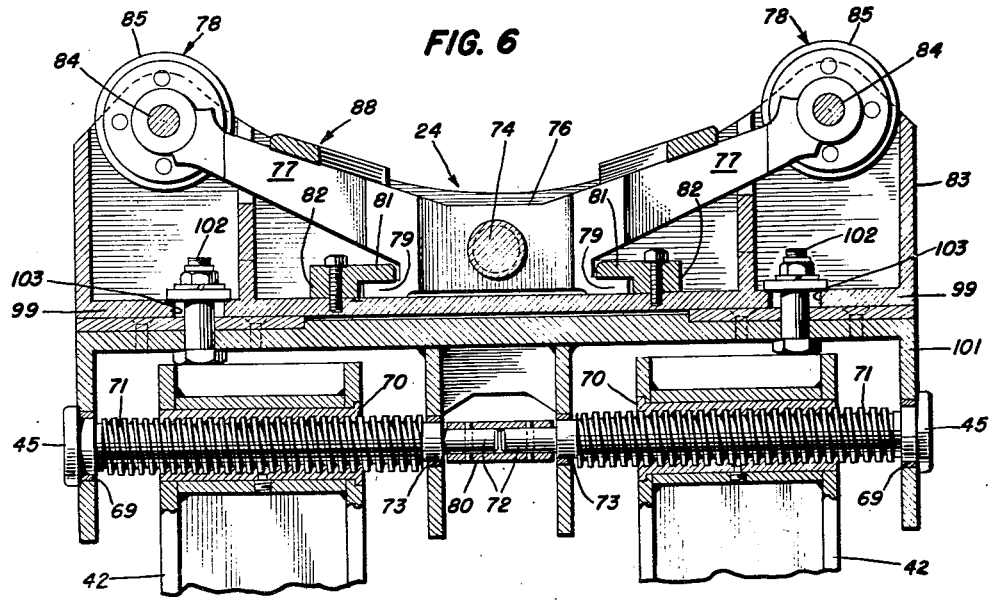
Fig. 6 is an enlarged transverse sectional view taken along a line substantially corresponding to line 6—6 of Fig. 4 and disclosing means for laterally shifting the position of the load supporting assembly with respect to the lift truck.

As before mentioned, the pivotal connection 45 serves a dual function which will now be described, with particular attention being directed to Fig. 6. Each of the pivotal connections at the upper end of the lift beams 41 includes a pin 45 having a bearing surface 69 which serves as the pivotal bearing surface for the load supporting assembly 24. A reduced, threaded shank portion 71 threadably engages internal threads of sleeve 70 rigidly secured within the upper end portion of each lift beam 41. It will be observed from an inspection of Fig. 6 that the threaded shank portions 71 extend transversely on either side of the lift beams 41 for a considerable distance to provide a transverse adjusting means for the load supporting assembly. The inner ends 72 of the threaded shank portions 71 may be supported by end bearings 73 in any suitable manner, sleeve coupling 80 being employed to connect pins 45 to one another for identical rotation. Likewise, any means found desirable for the purpose may be used to impart rotation to the threaded shank portions 71, such as a ratchet handle similar to that designated by numeral 67, Fig. 9, used in adjusting the length of the linking members.

Figure 4:
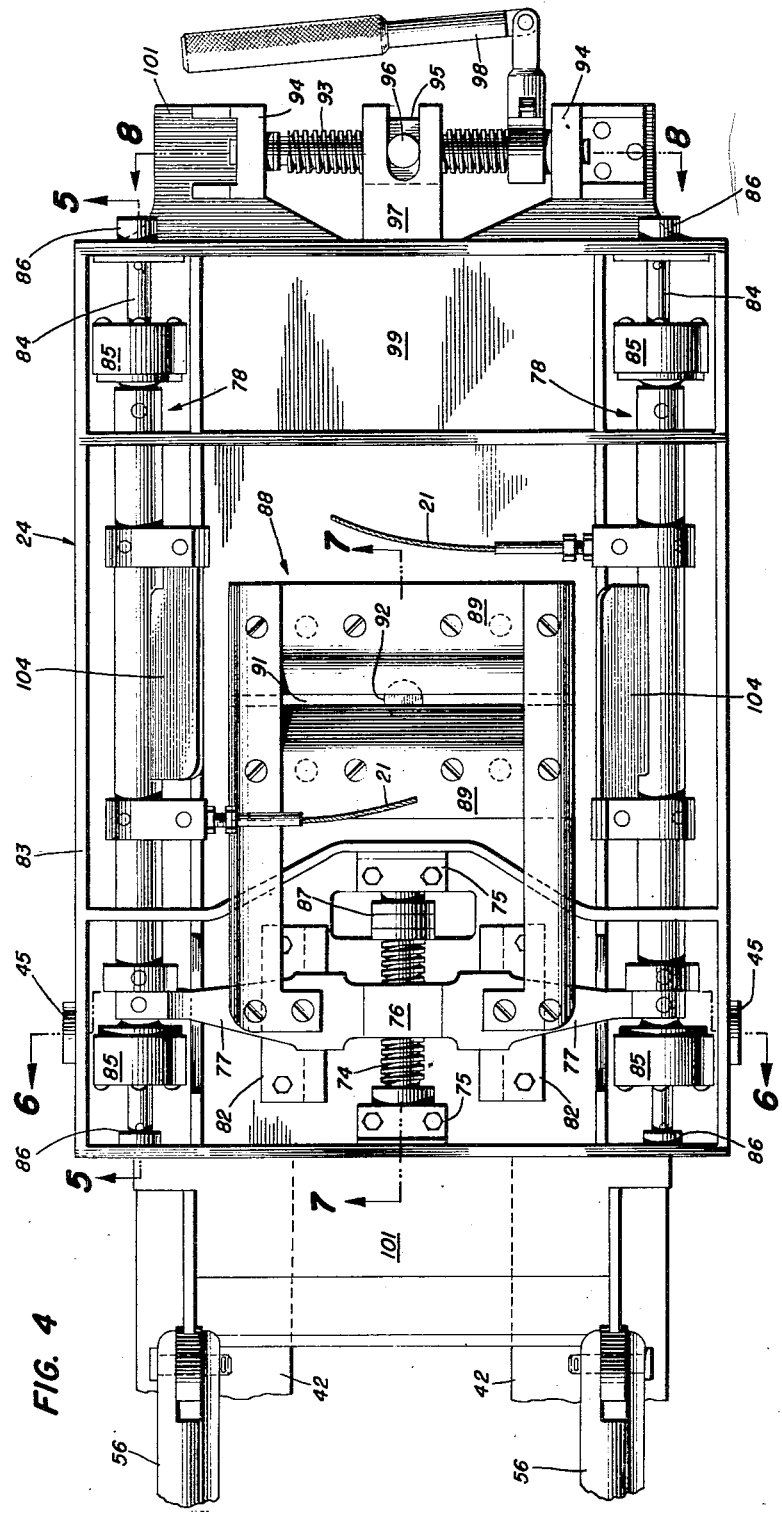
Fig. 4 is an enlarged top plan view of a load supporting assembly disclosing means for effecting rotational movement of a saddle portion about a vertical axis and additional means for moving roller assemblies longitudinally with respect to the saddle portion.
Figure 5:
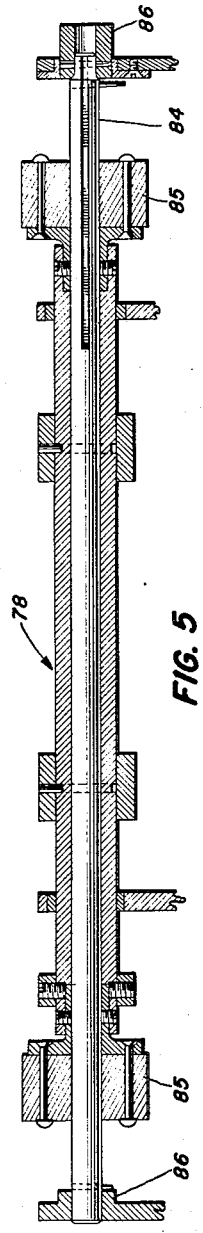
Fig. 5 is a longitudinal sectional view somewhat enlarged taken along line 5—5 of Fig. 4 disclosing one of the longitudinal guide bars and the roller assembly which may be rotated therewith and moved longitudinally thereon.
Figure 7:
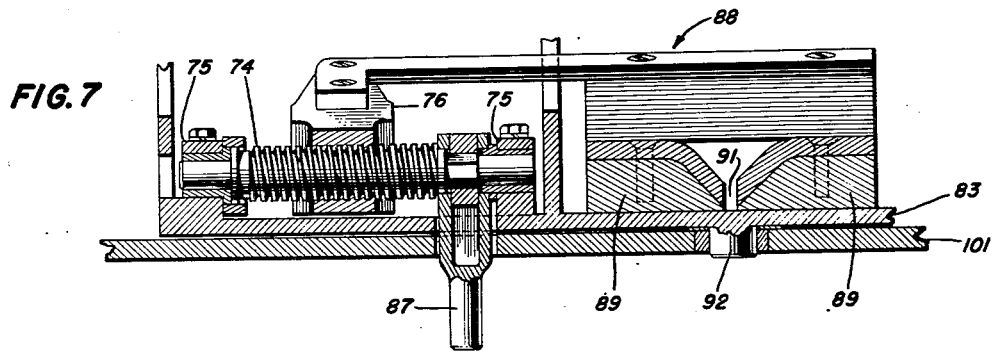
Fig. 7 is an enlarged longitudinal sectional view taken along a line substantially corresponding to line 7—7 of Fig. 4 disclosing means for moving the roller assembly along the guide bars and longitudinally with respect to the saddle.

The longitudinal adjusting means, best illustrated in Figs. 4 and 7, includes an externally threaded spindle 74 supported in any suitable manner at the outer ends such, for example, as by bearing supports 75. An internally threaded collar 76 in threaded engagement with spindle 74 is connected by laterally extending arms 77 to longitudinally slidable load roller assemblies, generally indicated by numeral 78 in Figs. 4, 5, and 6. Collar 76 is provided with laterally extending flanges 79 adapted to be slidably received under complementary, overhanging portions 81 of L-shaped guide brackets 82 which are securely mounted to the saddle 83. Each load roller assembly is slidably keyed to a longitudinally extending guide rod 84 and includes load supporting rollers 85. Each guide rod 84 is rotatably supported at the ends thereof by any suitable sleeve bearing 86. Rotation may be imparted to the threaded spindle 74 in any manner desired such, for example, as by ratchet means 87 which has been found to be satisfactory for the purpose.

A rearwardly extending load centering device, generally designated by numeral 88, is secured to the arms 77. It will be observed that the load centering device 88 is provided with blocks 89 which define a V-shaped slot 91 adapted to receive a depending lug, not shown, integral with or fastened to the bomb or other load to thereby center the load on the load roller assemblies 78. In addition, the V-shaped slot provides a means of visually determining the position of the load roller assemblies 78 on saddle 83 relative to the saddle pivot pin 92, Fig. 7. When the V-shaped slot overlies the pivot pin 92, the location of which can be indicated in any suitable manner, the load roller assemblies 78 are centered on the saddle 83. In addition, suitable notches may be provided along the edges of the saddle adjacent rollers 85 whereby it may be determined whether the load roller assembly is centered relative to the saddle.

Figure 8:
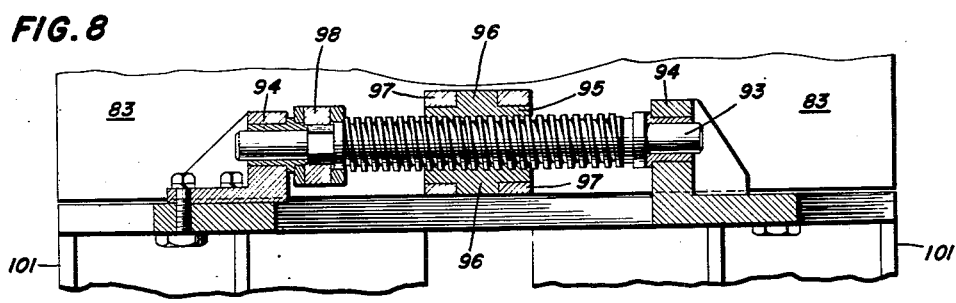
Fig. 8 is a sectional view taken along a line substantially corresponding to line 8—8 of Fig. 4 and disclosing an adjusting means for rotating the saddle about a vertical axis.

Referring now to Figs. 4 and 8, wherein the adjusting means for rotating the load about a vertical axis is best disclosed, it will be noted that a transverse threaded shaft 93 is provided and is supported at the outer ends thereof in bearing members 94. Surrounding the threaded shaft 93 and in threaded engagement therewith is an internally threaded block 95 having upstanding and depending pins 96 provided on the upper and lower surfaces thereof, respectively. The pins 96 are received between the tongues of bifurcated upper and lower longitudinally extending members 97 which are secured to the saddle 83. It will now be apparent that, when the threaded shaft 93 is rotated by any suitable means such as by a ratchet member 98, for example, the saddle will be rotated about the vertical pivot pin 92 which pivotally connects the base 99 of the saddle 83 to the lift platform 101. Bolts 102 which extend through arcuate apertures 103 in the bottom plate of saddle 83 function to connect the saddle to lift platform 101 and yet enables the saddle to be rotated about pivot pin 92 for limited rotational adjustments. Rotatably mounted swingable levers 104 are carried by the load roller assemblies 78 for the purpose of "dogging-down" or tightening the free ends of cables 21 so as to rigidly secure the load to the load supporting assembly.

The operation of the lift truck of the present invention will now be described and it will first be assumed that the longitudinal axis of the bomb bay of the aircraft to be loaded is parallel with the deck of the aircraft carrier. The forward-most ends of the linking members 56 are first pivotally connected to the flanges 35 in such a manner as to provide for horizontal lifting throughout all phases of the lifting operation. It will be recalled that parallel lifting is accomplished by establishing a parallelogram arrangement between the linking members 56 and the lift beams 42. This, in turn, is effected by employing the lowermost pivot apertures 37 in the pivotal connection between the linking members and the flanges. It will now be assumed that the load supporting assembly is in the lowered position thereof and the lift beams 42 and lift arms 43 as well as the support beams 40 are nested within the Y-shaped frame structure 28. The auxiliary carriage or skid 25 which carries a bomb is then wheeled into the open end of the Y-shaped chassis 19 so that the bomb will overlie the load supporting assembly 24 of the lift truck.

Next, the hydraulic pump enclosed within hydraulic cylinder 33 is set in operation by the actuation of pump handle 30. Actuation of pump handle 30 causes a flow of hydraulic fluid through hose lines 48 and 53 to the auxiliary cylinders 60 and the pistons 54 associated therewith to thereby lift the load supporting assembly 24 into engagement with the bomb and to commence the lifting operation. Now the auxiliary carriage may be wheeled away for another load. The bomb is next secured to the load supporting assembly 24 by any suitable means such as by cables 21 as shown in Fig. 1. The brakes 50, Figs. 1, 2, and 3, are now released and the lift truck is moved to a position directly beneath the bomb rack of the aircraft to be loaded. It will be understood, however, that where the bomb racks are at a sufficient height above the deck, the load transfer may be accomplished directly beneath the bomb racks. The brakes 50 are reset, and the pump handle 30 is again actuated until the bomb is raised in a vertical line to a position adjacent the bomb rack to be loaded, which may be of either the wing type or bomb bay type, of the aircraft.

Assuming next that it is determined that the longitudinal axis of the rack to be loaded is not quite parallel with the deck of the aircraft carrier, the linking members 56 are slightly extended by rotating drive rod 58 in the manner afore-described to thereby compensate for the difference between the angle of inclination of the longitudinal axis of the bomb rack relative to the deck of the carrier, and a condition of true parallelism.

Assuming further that the bomb must be moved slightly longitudinally, laterally, and rotationally, adjusting means 74, 71, and 93, respectively, are operated until the required movement of the bomb is effected. The bomb is then connected to the bomb rack, the cables removed from the bomb, and the pump release valve is opened to thereby cause the load supporting assembly 24 to descend to its initial, lowered position, at which time the lift truck is ready to receive another bomb from the auxiliary carriage 25.

Assuming now that the longitudinal axis of the bomb rack of the aircraft to be loaded is inclined at an angle of approximately 10 degrees relative to the deck of the carrier, the forward-most ends of the linking members 56 are pivotally connected within apertures 38 of flanges 36. The load is then received by the load supporting assembly 24 from the auxiliary carriage or skid 25 in the manner afore-described. The load is secured, the brakes are released, and the lift truck is wheeled to a position directly beneath the bomb rack to be loaded, and the loading operation is performed in the same manner as previously described in connection with the loading of a bomb rack having a longitudinal axis parallel with the deck of the aircraft carrier.

It will be apparent to those skilled in the art that certain alternative modifications of construction may be employed. For example, the inventive concept disclosed herein could alternatively be employed as a mobile or as a stationary and permanent installation for the lifting of various types of vehicles such as automobiles, trucks, railroad cars and the like. Other alternative constructions which conceivably might be used in connection with the present inventive concept are the utilization of different types or combinations of types of operating forces; the use of one lifting structure alone, or of a plurality of lifting structures in parallel; a variation of the distances of the beam pivot points in any manner found convenient for the result to be accomplished and yet retaining a straight line lifting movement; employing one or more members of different cross section and in different relative positions to each other for the lifting structure; the substitution of means other than mechanical means for obtaining the parallelogram lifting action; and the employment of the inventive concept disclosed herein for moving a load in a straight line in any desired direction.

Obviously many additional modifications and variations of the present invention are possible in the light of the above teachings. It is therefore to be understood that within the scope of the appended claims the invention may be practiced otherwise than as specifically described.

What is claimed is:

1. In a lift truck, a chassis, a frame comprising a plurality of interconnected channel members secured to and substantially coplanar with said chassis, a bracket slidably supported on the frame for longitudinal movement in a straight line, said frame including means for connecting said bracket to at least one of said channel members in longitudinal sliding engagement therewith, a lift beam pivotally connected at one end to said bracket, a lift platform, means for pivotally connecting said platform to the other end of said lift beam for rotation about a transverse axis, a load supporting saddle carried by said platform, a plurality of longitudinally disposed guide rods rotatably carried by said saddle and a load roller assembly slidably mounted for longitudinal movement on each of said rods, means for imparting longitudinal movement to each of said load roller assemblies with respect to said rods, means for imparting rotational movement to said load supporting saddle relative to said platform, a lift arm pivotally connected at one end thereof to said frame in longitudinal spaced relation with said bracket and pivotally secured at the other end thereof to substantially the mid-point of said lift beam whereby the platform will rise in a substantially vertical, straight line during all phases of the lifting operation, said plurality of interconnected channel members being in underlying and supporting relationship with said lift beam and said lift arm whereby the lift beam and lift arm nest within the channel members when the lift beam and lift arm are in a lowered position a linking member having one end thereof pivotally secured to said bracket in spaced relation to said lift beam and the other end pivotally secured to said lift platform adjacent an end thereof and in spaced relation to said lift beam, said linking member including a pair of telescopically connected portions and means for longitudinally moving one of said portions with respect to the other to thereby alter the length of the linking member and rotate the platform about a transverse axis and means for actuating said lift arm and lift beam to an elevated position, said lift beam, said linking member, said bracket and said platform together constituting a parallelogram, whereby the platform will normally maintain a parallel relation with the surface upon which the lift truck rests during all phases of the lifting operation, said bracket including a plurality of means for pivotally connecting said linking member and said lift beam thereto in spaced relationship with one another in a predetermined manner whereby the parallelogram relationship between the lift beam, linking member, bracket and platform may be altered to thereby elevate a load to a position in which the longitudinal axis of the load is inclined relative to the supporting surface for the lift truck by a predetermined angularity.

2. A lift truck as set forth in claim 1 wherein said means for pivotally connecting the platform to the lift beam comprises transversely extending bearing means projecting through said platform and said lift beam and means for imparting lateral movement to said platform relative to said lift beam.

3. A lift truck as set forth in claim 2 wherein said means for imparting lateral movement to said platform includes an externally threaded shank rotatably supported by said platform and an internally threaded sleeve carried by said lift beam and in threaded connection with said shank whereby the platform is moved laterally relative to the sleeve and lift beam as the shank is rotated.

4. A lift truck as defined in claim 1 wherein said means for imparting longitudinal movement to said load roller assemblies includes an externally threaded spindle rotatably carried by said saddle, an internally threaded collar in threaded connection with said spindle, and laterally extending arms connected at one end to said collar and at the other end thereof to each of said load roller assemblies whereby the load roller assemblies are moved longitudinally with respect to the supporting rods in response to rotational movement of the spindle.

5. A lift truck as defined in claim 1 wherein said means for imparting rotational movement to said load supporting saddle comprises an externally threaded shaft rotatably supported upon said platform, an internally threaded block threadably connected to said shaft, pins projecting from said sleeve and operatively engaged with a portion of said saddle, means for pivotally connecting said saddle to said platform providing for rotational movement of the saddle about a vertical axis when the threaded shaft is rotated.

6. A lift truck as defined in claim 1 wherein the means for extending the length of the linking member comprises a worm wheel rotatably connected in longitudinal alignment with one portion of the linking member, a longitudinally extending externally threaded shank integral with said worm wheel and in telescopic threaded connection with the other portion of the linking member, a transversely extending rotatably mounted drive rod, and a worm gear on said rod and in driving connection with said first-mentioned worm wheel whereby the length of the linking member is altered when the drive rod is rotated.

7. A lift truck as defined in claim 1 wherein the means for actuating the lift arm and lift beam includes a source of hydraulic fluid under pressure, a main cylinder hydraulically connected to said source and pivotally connected at one end thereof to said frame, and a piston telescopically received by the other end of said cylinder and pivotally connected to the lift arm.

8. A lift truck as defined in claim 7 wherein the means for actuating the lift arm and lift beam further includes an auxiliary cylinder hydraulically connected to the source of hydraulic fluid and rigidly connected at one end thereof to said frame, and a piston telescopically received by the other end of said auxiliary cylinder and releasably connected to said lift arm whereby the auxiliary cylinder and piston elevate the lift arm to a predetermined position at which the main cylinder and piston elevate the lift arm to disconnect the auxiliary piston therefrom and complete the lifting operation.

9. A lift truck comprising a Y-shaped chassis including a frame of interconnected channel members, a load supporting assembly, connecting means pivotally connected at one end thereof to said load supporting assembly and pivotally and slidably connected to the other end thereof to said frame, said connecting means being movable from a first position of nesting relation with said channel members to a second position of inclination with respect to said channel members, said load supporting assembly being suspended within the open end of said Y-shaped chassis when said connecting means is in the first position of nesting relation with said channel members, means for moving said load supporting assembly from said first position to said second position through a predetermined angle of inclination relative to said frame and in a straight line normal to the frame, said connecting means including means slidably secured to said frame and provided with a plurality of pivotal connection means, an extensible linking member pivotally connected at one end thereof to said load supporting assembly and pivotally connected at the other end thereof to a predetermined one of said pivotal connection means in accordance with the predetermined angle of inclination of the load supporting assembly relative to the frame, said load supporting means including a platform pivotally and threadably connected to said connecting means for rotational movement about a horizontal axis and for lateral movement with respect to said connecting means, a saddle swivelly connected to said platform for rotational movement about a vertical axis, means for effecting a rotational movement of said saddle about a vertical axis, a load roller assembly slidably secured to said saddle for longitudinal movement with respect thereto, and means for effecting a longitudinal movement of said load roller assembly with respect to the saddle.

References Cited in the file of this patent
UNITED STATES PATENTS

| | | |
|---|---|---|
| 1,844,585 | Manley | Feb. 9, 1932 |
| 2,454,840 | Ryan | Nov. 30, 1948 |
| 2,476,380 | Manke | July 19, 1949 |
| 2,523,734 | Stephenson et al. | Sept. 26, 1950 |
| 2,613,822 | Stanley | Oct. 14, 1952 |

FOREIGN PATENTS

| | | |
|---|---|---|
| 653,079 | Germany | Nov. 13, 1937 |